United States Patent [19]
Lewis

[11] 3,866,115
[45] Feb. 11, 1975

[54] THICKNESS GAUGE SYSTEM

[76] Inventor: David W. Lewis, Rt. 2, Box 198, Charlottesville, Va. 22901

[22] Filed: Aug. 28, 1973

[21] Appl. No.: 392,199

[52] U.S. Cl............................ 324/34 TK, 425/141
[51] Int. Cl............................................. G01r 33/00
[58] Field of Search......... 324/34 TK; 425/141, 367

[56] References Cited
UNITED STATES PATENTS

| | | | |
|---|---|---|---|
| 1,925,904 | 9/1933 | Mayne | 324/34 TK |
| 1,946,924 | 2/1934 | Allen et al. | 324/34 TK |
| 1,989,038 | 1/1935 | Brown | 425/141 |
| 2,703,384 | 3/1955 | Rendel | 324/34 TK |
| 3,513,555 | 5/1970 | Vachon | 324/34 TK |

FOREIGN PATENTS OR APPLICATIONS

| | | | |
|---|---|---|---|
| 1,046,896 | 12/1958 | Germany | 324/34 TK |

Primary Examiner—Stanley T. Krawczewicz
Attorney, Agent, or Firm—Wm. J. Stephenson

[57] ABSTRACT

A device for monitoring the thickness of films of non-conductive material while the film or web is moving, and particularly while the film is still on the calender roll used in forming the same. The device employs a proximity electronic system. A device is mounted so as to be free to move as the thickness of the film or material passing thereunder varies. It is not necessary that the electronic probe actually contact the film. Oil, air or gasses, etc., which may lie between the probe and the surface of the film have no affect on the film.

6 Claims, 3 Drawing Figures

THICKNESS GAUGE SYSTEM

This invention relates to a novel means for accurately measuring the thickness of a film or layer of nonconductive material such as rubber or plastic, as the material travels over the surface of a metal element such as a metal calender or idling roll, or is supported by some metallic support such as a continuously travelling metal belt, particularly a belt of the type upon which the material could have been initially deposited. This device employs a proximity electronic system. Therefore, it does not require that the film or sheet, whose thickness is to be measured, actually be in contact with the sensing element or electronic probe. This novel sensing means may be used to continuously monitor the thickness of any conductive material which may be passed thereunder such as film or sheet of plastic material, of rubber or a composite sheet or layers of any material so long as the composite is nonconductive. This invention consists primarily of a proximity gauging system including a small mechanical holder which houses a direct reading linearly detecting electric probe while the metallic support for the film acts as the proximotor. The probe is mounted so as to constantly remain at a fixed distance from one side of the material whose thickness is to be measured. The mechanical holder is so mounted that its movements are solely affected by changes in thickness of the material passing thereunder. The position of the mechanical holder is in no way affected by any slight changes in position of the supports for the holder as for example changes in the forming apparatus, due to mechanical stresses or thermal conditions.

IN THE DRAWINGS

Figure 1:
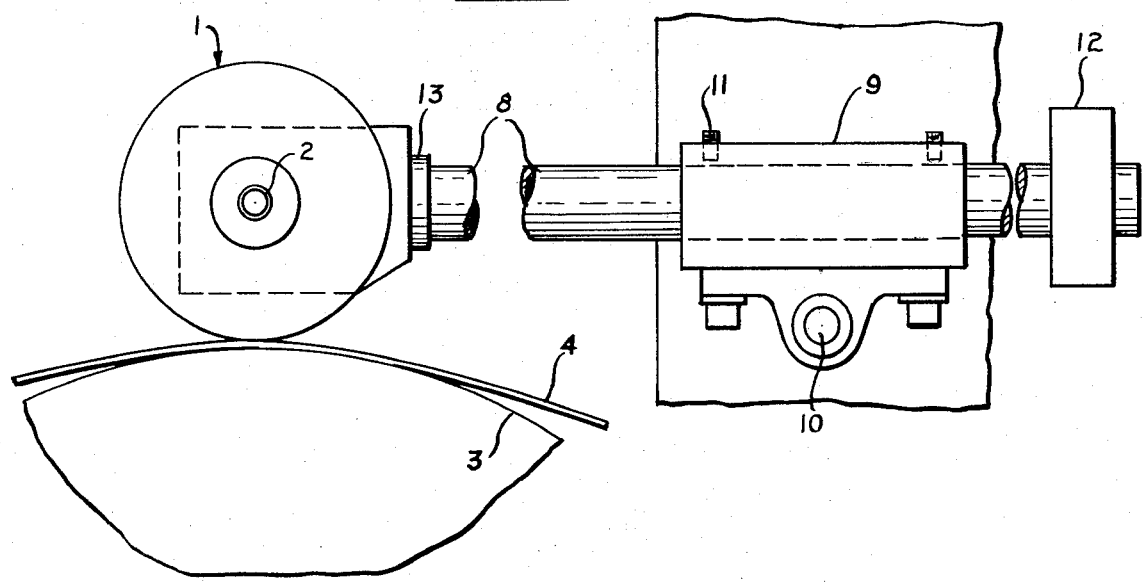
FIG. 1 illustrates a conventional calender for plastic or rubber sheeting with the thickness gauge of the present invention mounted to monitor the final thickness of the material as it passes over the idler roll upon leaving the calender.

In FIG. 1 the gauging system constituting the subject matter of this invention has been shownn as mounted on a conventional calendering apparatus in such a manner as to monitor the thickness of the sheet as it emerges from the apparatus. It is understood, however, that this gauging system is in no way limited in use to this or any particularly forming apparatus. It can be separately mounted to monitor a sheet independent of any forming apparatus. Specifically, this gauging system can be used independently so as to constantly measure the thickness of material being passed from a supply roll to some manufacturing apparatus wherein it was to be used. The gauging system has three main parts, a mechanical holder, which carries the electric probe of a direct reading linearly detecting electronic proximity measuring system, a rod to position and support the mechanical holder, and a support element for said rod.

Figure 2:
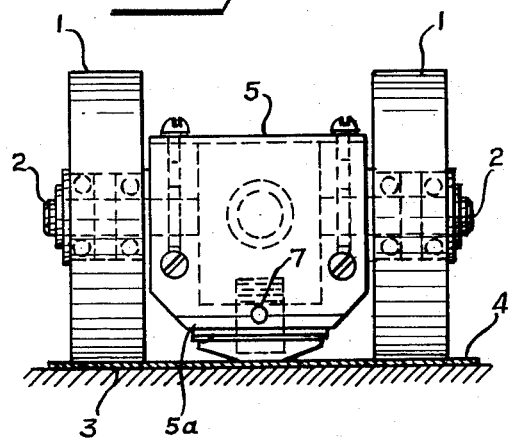
FIG. 2 is a detailed showing of the mechanical holder for the electronic probe.
Figure 3:
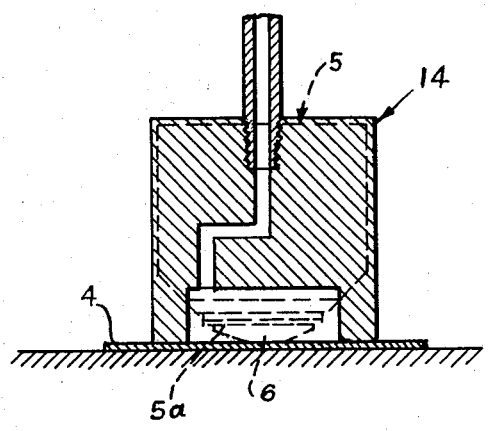
FIG. 3 is an optional embodiment of the mechanical holder.

The mechanical holder for the electric probe is positioned by a positioning element which in FIG. 1 is represented by a pair of wheels 1 mounted for free rotation about a generally horizontal axis. The wheels as shown in FIG. 2 may be mounted on two separate and independent shafts 2 which individually support each wheel or a single shaft may be used as desired. The wheels, however, must be of sufficient width in regards to the weight of mechanical holder so that they will in no way mar the surface of the material being measured. The wheels rest upon the continuously moving sheet of nonconductive material 4 and ssid sheet is supported immediately under said wheel by a metallic surface such as an idler roll 3 as shown in FIG. 1. The electronic probe is an element of a conventional proximity measuring system. Such systems are well known in the art and may be obtained from the Bentley-Nevada Corporation of Minden, Nev. It is itself carried within a mechanical housing 5 in which the shafts are suitably mounted. The electronic probe is mounted within a body of noninductive material, such as "Teflon" and in FIG. 3 is represented by the numeral 6 which is adjustably mounted in the main body of the mechanical housing 5 by any suitable adjusting mounting means which will allow the probe to be adjustably positioned between the main body of the mechanical housing and a plane represented by the peripheral surfaces of the wheels 1. In the drawing (FIG. 2) the adjusting means is diagrammatically represented by a screw and a set screw 7 which adjustably positions the electronic probe. The housing itself may be a multi-part affair, the parts of which are suitably held in position by means of conventional elements such as screws or bolts as shown in FIG. 2. The parts of the housing 5a near the active end of the probe are also of non-inductive material so as not to disturb the linearity of the system. The housing is mounted on the end of rod 8 by means of a conventional bearing 13 designed to allow the mechanical holder to freely rotate around the axis of the rod 8. The rod is adjustably mounted in a supporting element generally shown as 9. This supporting element may be suitably mounted on any portion of the forming apparatus found to be convenient or may even be mounted on separate stand or positioning means detached from the forming apparatus. The supporting element includes supporting shaft 10 whose axis is generally parallel to the roller supporting shaft 2. Support element 9 and shaft 8 thus may rotate about the axis of shaft 10. Rod 8 is adjustably mounted in the support element 9 as illustrated by set screws 11. Set screws 11 are given as an example only as a suitable means for adjusting the effective length of rod 8. It is equally obvious that element 8 could be made adjustable by other means such as the use of a multi-part rod with one part adjustably positioned within the other. In order to adjust the pressure which the mechanical holder may exert on the sheet being monitored, it may be desirable to provide a counter weight on opposite end of the shaft 8 as shown at 12. This counter weight obviously may be positioned so as to control the pressure exerted by mechanical holder on the sheet material down to approximately zero. The drawings illustrate the use of a counter weight but obviously other means may be used also to control the bearing pressure exerted by the mechanical holder. The entire system including the mechanical holder positioning elements and support means are most delicate and may be compared to prior gauging devices used in this art as the present sound recording or pick up heads compare to those used on the early phonographs.

Under some conditions, the use of rolls for positioning the mechanical holder may be found to be undesirable. In such instances, other supporting means may be used such as a pneumatic servo-mechanism support 14, as shown in FIG. 3, an electromagnetic field, or any other means which would properly position the mechanical holder without requiring the same to contact the surface of the film being monitored. It may be readily understood from the above description that this new electronic proximity gauging system has many advantages over other gauging systems previously used in the art since the use of the electric proximity system produces a direct reading due to the linear detecting principal which completely eliminates the need for complicated electrical back up systems previously used in the art such as that illustrated in U.S. Pat. No. 1,989,038. The use of the direct reading linearly detecting electric proximity system will give accurate readings within a fraction of a mil. Also the delicate mounting system which carries the probe itself will completely eliminate the effects of any mechanical changes in the forming apparatus such as distortion in the framing of the calendering apparatus due to changes resulting from growth in the calender rolls from thermal changes or other stresses will not be transmitted to the mechanical holder of the electronic probe. Thus, this mechanical holder is at all times supported directly above and in fixed relationship to the metal support for the sheet material being monitored. When separate supports for the gauging system are provided, the possibility of any changes occurring in the calendering apparatus affecting the gauging system are completely eliminated.

No claim is here made as to any novelty in the electronic probe and the electronic system per se since such systems are well known in the art as previously acknowledged herein and are completely described, together with various uses therefor in catalogues of the said Bentley-Nevada Corporation. It is also obvious this proximity electronic gauge system may be so designed as to display through and/or to record on any analog or digital permanent recording device such as paper, tape, graph paper, punch cards, or non-permanent displays such as cathode ray tubes. Such displays or recordings may be obviously used for any number of purposes such as for controlling and adjusting the forming machine in response to the display signal or as a means for controlling the operation of any machine to which the material so monitored is to be fed, as well as merely providing a permanent or temporary recording of the conditions monitored.

Having described my invention I claim:

1. A device for the continuous monitoring of thickness of a continuously moving sheet of non-conductive material using a proximity measuring system including a proximotor and a probe, a continuously moving metallic support for said sheet material, a probe mounted directly above to said moving sheet material and supported by said material so as to be held at a constant distance from the surface of said sheet material, positioning means for said electronic probe consisting of positioning elements directly supported on the continuous moving sheet of material and mounted to move in harmony with any variation in the thickness of said sheet, said electronic probe being supported non-inductively in a mechanical housing supported by said positioning elements, said housing being freely rotatably supported on the end of a rod element, said rod element being rotatably supported on a horizontal axis parallel to the plane of movement of said sheet of material, said axis being stationarily mounted relative to said moving metallic support for said sheet of non-conductive material, said rod element being adjustably mounted relative to said horizontal axis and carrying an adjustable counterweight sufficient to reduce any pressure exerted on said continuously moving sheet by said positioning means for said probe to approximately zero, said electronic probe being so constructed and arranged as to produce an electronic signal upon any lineral movement of said electronic probe normal to said metallic support for said sheet material.

2. The invention of claim 1, wherein the rod member is rotatable relative to the horizontal supporting shaft.

3. The invention of claim 1 wherein said positioning elements for the said electronic probe are a pair of wheels rotatably mounted upon shaft means parallel to the plane of the material being measured.

4. The invention of claim 1 wherein said positioning elements are pneumatic cushions.

5. The invention of claim 1 wherein the electronic probe is adjustably mounted in the mechanical housing.

6. The invention of claim 5 wherein the mechanical holder is a multi-part member which carries both the electronic probe and the positioning elements.

* * * * *